US009210761B2

(12) United States Patent
Nackaerts et al.

(10) Patent No.: US 9,210,761 B2
(45) Date of Patent: Dec. 8, 2015

(54) LIGHTING SYSTEM (75) Inventors: Axel Nackaerts, Heverlee (BE); Viet Hoang Nguyen, Leuven (BE)

(73) Assignee: NXP, B.V., Eindhoven (NL)

( * ) Notice: Subject to any disclaimer, the term of this patent is extended or adjusted under 35 U.S.C. 154(b) by 171 days.

(21) Appl. No.: 13/599,118

(22) Filed: Aug. 30, 2012

(65) Prior Publication Data
US 2013/0057157 A1 Mar. 7, 2013

(30) Foreign Application Priority Data

Sep. 2, 2011 (EP) .................................... 11179808

(51) Int. Cl.
H05B 37/02 (2006.01)
H05B 33/08 (2006.01)

(52) U.S. Cl.
CPC ........ *H05B 33/0869* (2013.01); *H05B 33/0872* (2013.01); *H05B 37/0218* (2013.01); *Y02B 20/46* (2013.01)

(58) Field of Classification Search
CPC .... H05B 41/325; H05B 37/02; H05B 39/042; F21Y 2101/02
USPC ............................ 315/154, 158, 151; 362/231
See application file for complete search history.

(56) References Cited

U.S. PATENT DOCUMENTS

| 5,721,471 | A  | * | 2/1998  | Begemann et al. ........... 315/158 |
| 6,052,179 | A  | * | 4/2000  | Prohaska et al. ............. 356/73.1 |
| 8,686,644 | B2 | * | 4/2014  | Wootton ........................ 315/117 |
| 8,805,550 | B2 | * | 8/2014  | Chemel et al. .................... 700/22 |
| 8,823,277 | B2 | * | 9/2014  | Chemel et al. ................. 315/291 |
| 8,829,821 | B2 | * | 9/2014  | Chobot et al. ................. 315/312 |
| 8,836,243 | B2 | * | 9/2014  | Eisele et al. .................... 315/307 |
| 2006/0158881 | A1 | * | 7/2006  | Dowling ........................ 362/231 |
| 2007/0115658 | A1 | * | 5/2007  | Mueller et al. ................ 362/231 |
| 2008/0302657 | A1 | * | 12/2008 | Luten et al. .............. 204/298.36 |
| 2008/0310005 | A1 | * | 12/2008 | Tonar et al. .................... 359/265 |
| 2009/0118623 | A1 | * | 5/2009  | Serov et al. .................... 600/476 |
| 2010/0231131 | A1 |   | 9/2010  | Anderson |
| 2011/0002028 | A1 | * | 1/2011  | Luten et al. .................... 359/267 |
| 2011/0031903 | A1 |   | 2/2011  | Nguyen Hoang et al. |
| 2011/0227487 | A1 | * | 9/2011  | Nichol et al. ................. 315/158 |

FOREIGN PATENT DOCUMENTS

| EP | 2 296 436 A1 | 3/2011 |
| WO | 2009/095853 A2 | 8/2009 |

OTHER PUBLICATIONS

Extended European Search Report for European Appln. No. 11179808.8 (Nov. 18, 2011).

Communication pursuant to Article 94(3) EPC for counterpart application EP 11 179 808.8 (Apr. 24, 2015).

* cited by examiner

*Primary Examiner* — Douglas W Owens
*Assistant Examiner* — Syed M Kaiser (57) ABSTRACT A lighting system uses interior and exterior light sensors for detecting lighting level and color. A lighting unit has a controlled color and intensity so that a color match zone can be defined where the interior space lighting has color temperature based on the exterior lighting conditions.

20 Claims, 8 Drawing Sheets

LIGHTING SYSTEM

CROSS-REFERENCE TO RELATED APPLICATIONS

This application claims the priority under 35 U.S.C. §119 of European patent application Ser. No. 11179808.8, filed on Sep. 2, 2011, the contents of which are incorporated by reference herein.

Lighting systems are designed to make the lighting in an interior space as comfortable as possible. However, the desired lighting may vary as a function of the external lighting conditions, particularly if part of the lighting arrangement includes a portion of external light received through a window or roof. In this case, changing light conditions outside during the course of a day mean that the desired lighting inside may also vary over time.

Thus, dynamic light intensity and color temperature may be desired, and this is a feature of lighting for so-called "smart buildings".

A particular cause of discomfort can be a mismatch between the color temperature inside and outside a building. The eyes can correct for this quite quickly when moving in or out of the building, but when near a window, the colors inside do not match the colors outside.

The color temperature changes during the day. People are most comfortable with natural sunlight, but warmer light is often desired during night time.

If lighting is tuned to one color temperature, there is of course no possibility to select the desired lighting effects. Thus, manually adjustable color lighting systems are well known.

The need to change the lighting conditions frequently during the course of a day makes manual adjustment cumbersome, and there is therefore a need for an automated system that is able to create desired lighting conditions over time.

According to the invention, there is provided a lighting system for an interior space comprising:

at least one light sensor for determining the exterior lighting color;

a set of light sensors for the interior space for determining the interior lighting level and color;

a lighting unit having adjustable color and intensity; and a controller for controlling the lighting unit, wherein the controller is adapted to:

adjust the color and intensity of the lighting unit based on the light sensor outputs thereby to obtain a color match zone where the interior space lighting has a color temperature dependent on the exterior lighting, wherein the adjusting takes place during the course of the day.

This system is able to match the inside lighting color temperature with the outside lighting color temperature. The color perception inside then improves since it is consistent with the outside light conditions. The adjustment implements a feedback system for controlling the lighting unit.

In one example, in the color match zone, the interior space lighting has a color temperature matched to the color temperature of the exterior lighting, when the exterior lighting color temperature is within upper and lower bounds. The color temperature then follows the outside light, when the outside light color temperature is within a suitable range. For example, during the beginning and end of the day, the color temperature may be too low, so that the internal color temperature is kept at a lower threshold.

In the color match zone, the interior space lighting can also have a light intensity matched to the exterior light intensity, when the exterior light intensity is within upper and lower bounds. Again, the intensity follows the outside conditions if they are within reasonable bounds.

A timer can be provided for the time of day. This can be used to provide a default intensity profile, for example. The exterior intensity level may then not need to be measured, as a default intensity profile for the duration of the day can be followed. The interior intensity then follows a standard pattern representing the typical evolution of light intensity with time.

When near a window, the color temperatures can be matched, so that unpleasant color boundaries are avoided. In this case, the color match zone can be at least in the vicinity of a window.

The system is able to adjust the light color temperature without adjusting the light intensity if the light intensity is already suitable. Similarly, the intensity can be adjusted with a fixed color temperature.

The lighting unit adjustment can add only the required amount of light taking into account the lighting provided by exterior light. This reduces overall power consumption, while improving the light quality and stability.

This reduction in lighting by using a feedback control can increase the total lifetime of the system. The feedback system also enables the lighting color to be kept consistent over time even when the light source characteristics change with ageing.

The system can be installed in an existing building and the feedback system can be used to make the new lighting unit fit in immediately with existing lighting units, by creating smooth transition zones with existing light sources.

The controller can be further adapted to:

adjust the color and intensity of the lighting unit based on user input thereby to obtain a user defined color zone, and to provide a color gradient between the user defined color zone and the color match zone.

In this way, a part of the interior space can have a user defined color, but the system provides gradual transitions to the color match zone where there is matching of the color temperature to the exterior lighting conditions.

The invention also provides a method of controlling a lighting system for an interior space, comprising:

determining the exterior lighting color;

determining the interior lighting level and color;

controlling a lighting unit to adjust the color and intensity based on the determined lighting colors and lighting level thereby to define a color match zone where the interior space lighting has a color temperature dependent on the exterior lighting, wherein the adjusting takes place during the course of the day.

Examples of the invention will now be described in detail with reference to the accompanying drawings, in which.

The invention provides a lighting system which uses interior and exterior light sensors for detecting lighting level and color. A lighting unit has a controlled color and intensity so that a color match zone can be defined where the interior space lighting has color temperature based on the exterior lighting conditions.

Figure 1:
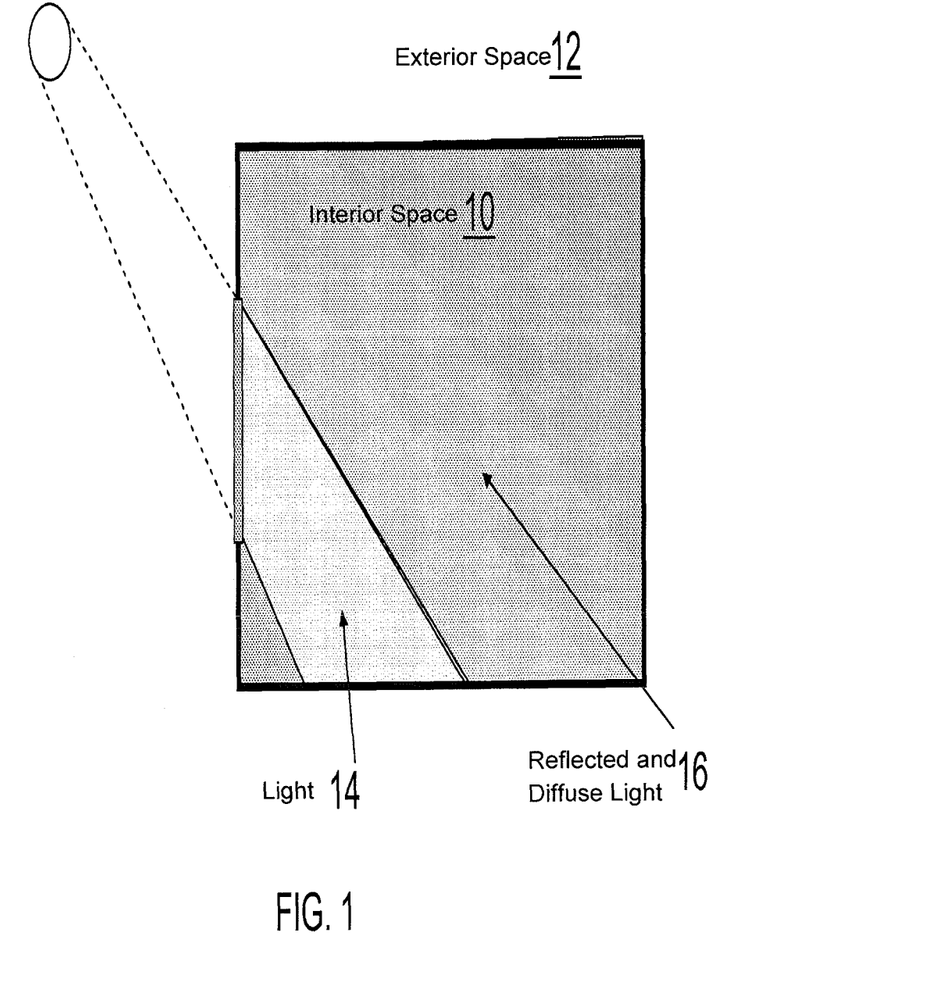
FIG. 1 shows how exterior light creates different lighting areas in an interior space.

FIG. 1 shows how exterior light creates different lighting areas in an interior space.

The interior space (such as a room) is shown as 10. The exterior space 12 (outdoors) provides light to the interior space through a window. The light 14 shining in has a color temperature and intensity dependent on the outside conditions. The light 14 can be bright sunlight, and reflected and diffused light 16 fills the remainder of the room, but with a lower intensity. There is thus an intensity boundary, but with similar color.

Figure 2:
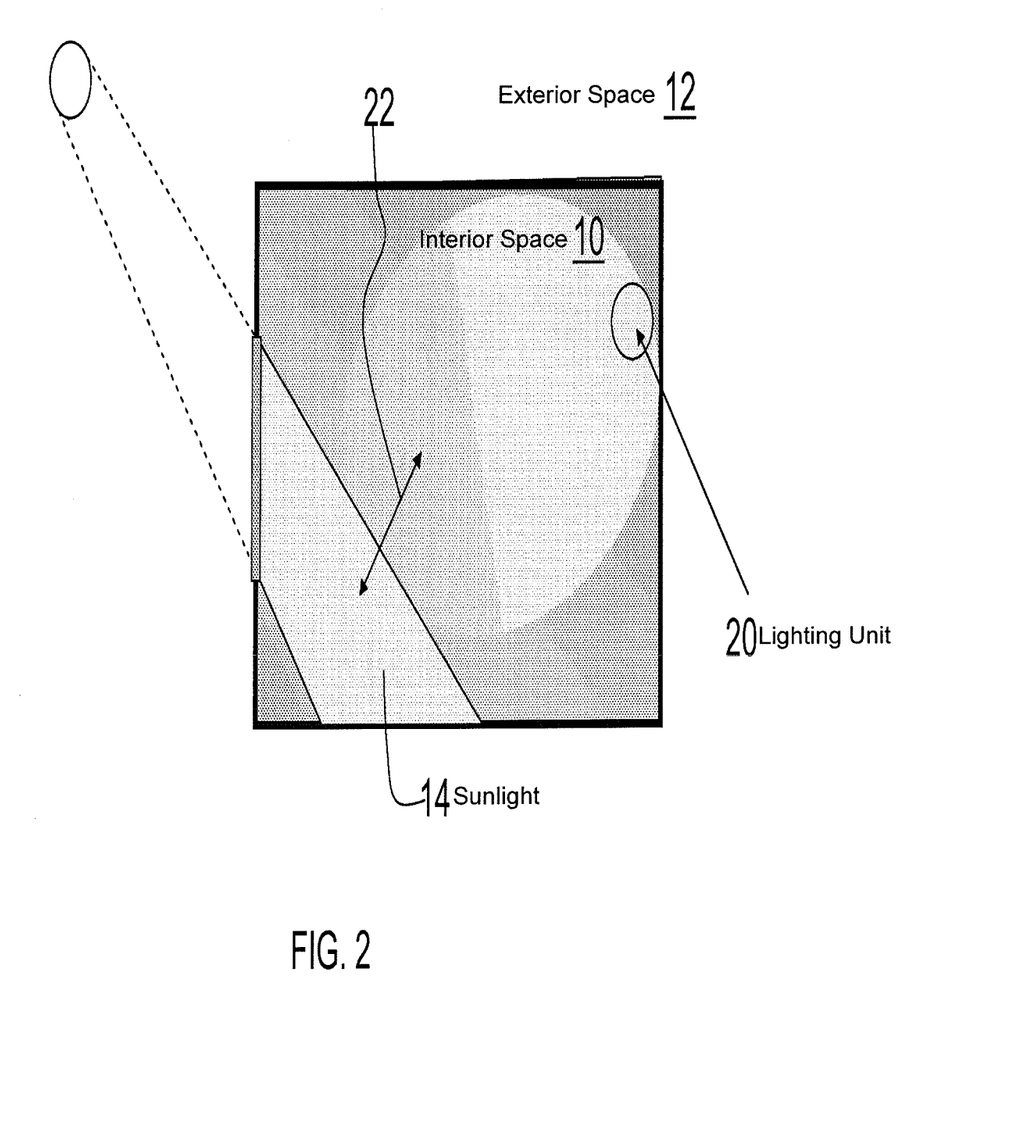
FIG. 2 shows the problem this causes when interior lighting is used in combination with the exterior lighting shown in FIG. 1.

FIG. 2 shows the problem this causes when interior lighting is used in combination with the exterior lighting shown in FIG. 1. A lighting unit is shown as 20, and this creates a lighting zone, of decreasing intensity with distance from the lighting unit 20. Where the lighting zone overlaps with the bright sunlight 14, there is a mismatch in color temperature, as well as a light intensity boundary.

Figure 3:
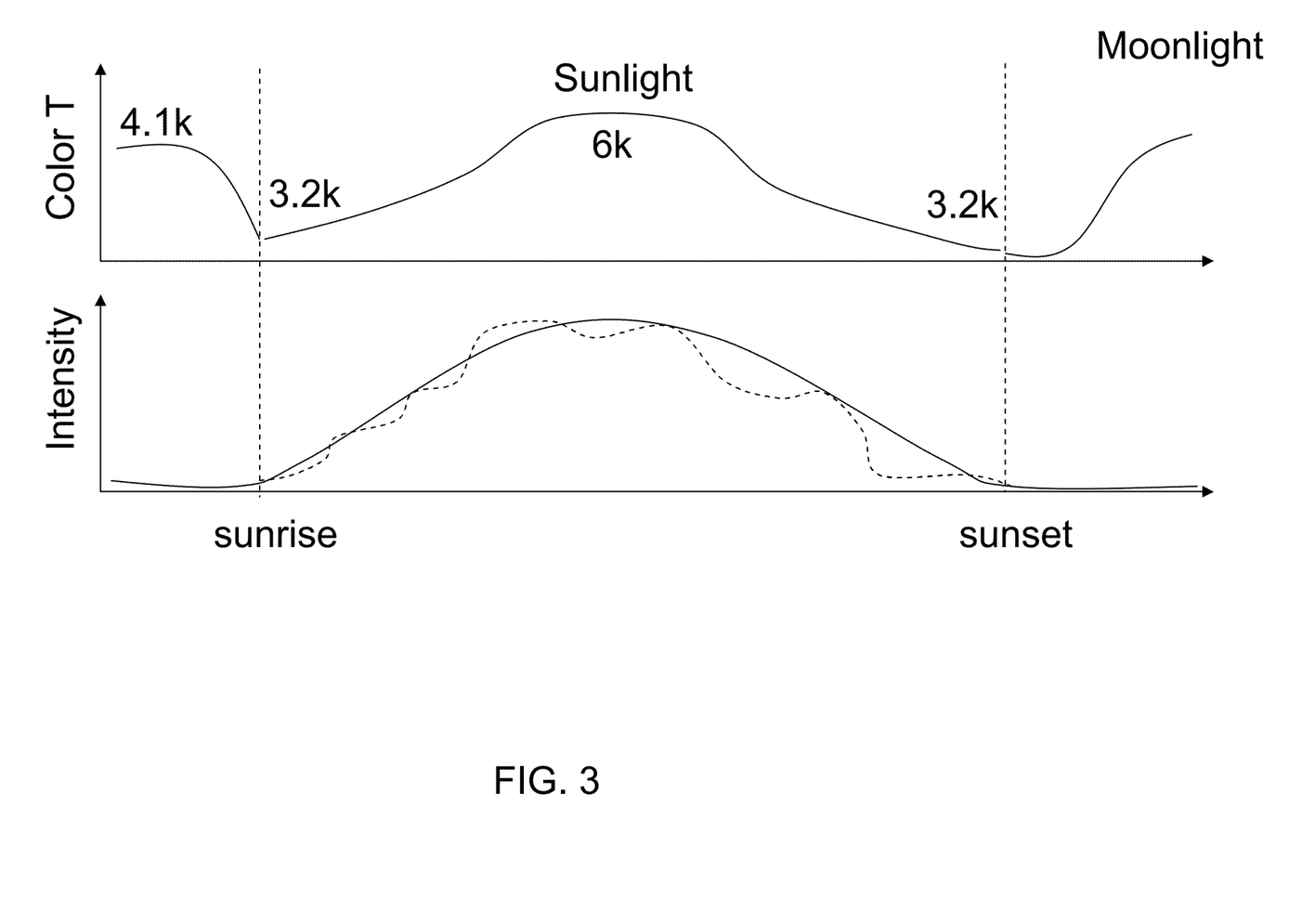
FIG. 3 shows how the color temperature and light intensity vary during the course of a day.

FIG. 3 shows how the color temperature and light intensity vary during the course of a day. Near sunrise and sunset, the color temperature is low (such as 3.2K) representing warm colors, whereas in the middle of the day, the color temperature is much higher (such as 6K) representing cool (bluish white) colors. The color temperature is shown in the top plot. The color is generally white, but with a reddish shift at the beginning and end of the day and a bluish shift in the middle of the day.

At night, moonlight typically has an intermediate color temperature.

The intensity essentially increases to a peak and then decreases as shown in the bottom plot. The intensity will vary with faster local fluctuations, representing different cloud cover, and shadowing as a result of the different position of the sun in the sky (by trees, buildings etc), as well as weather conditions (such as snow, clear skies, overcast skies). These fluctuations are shown as the dotted plot.

Figure 4:
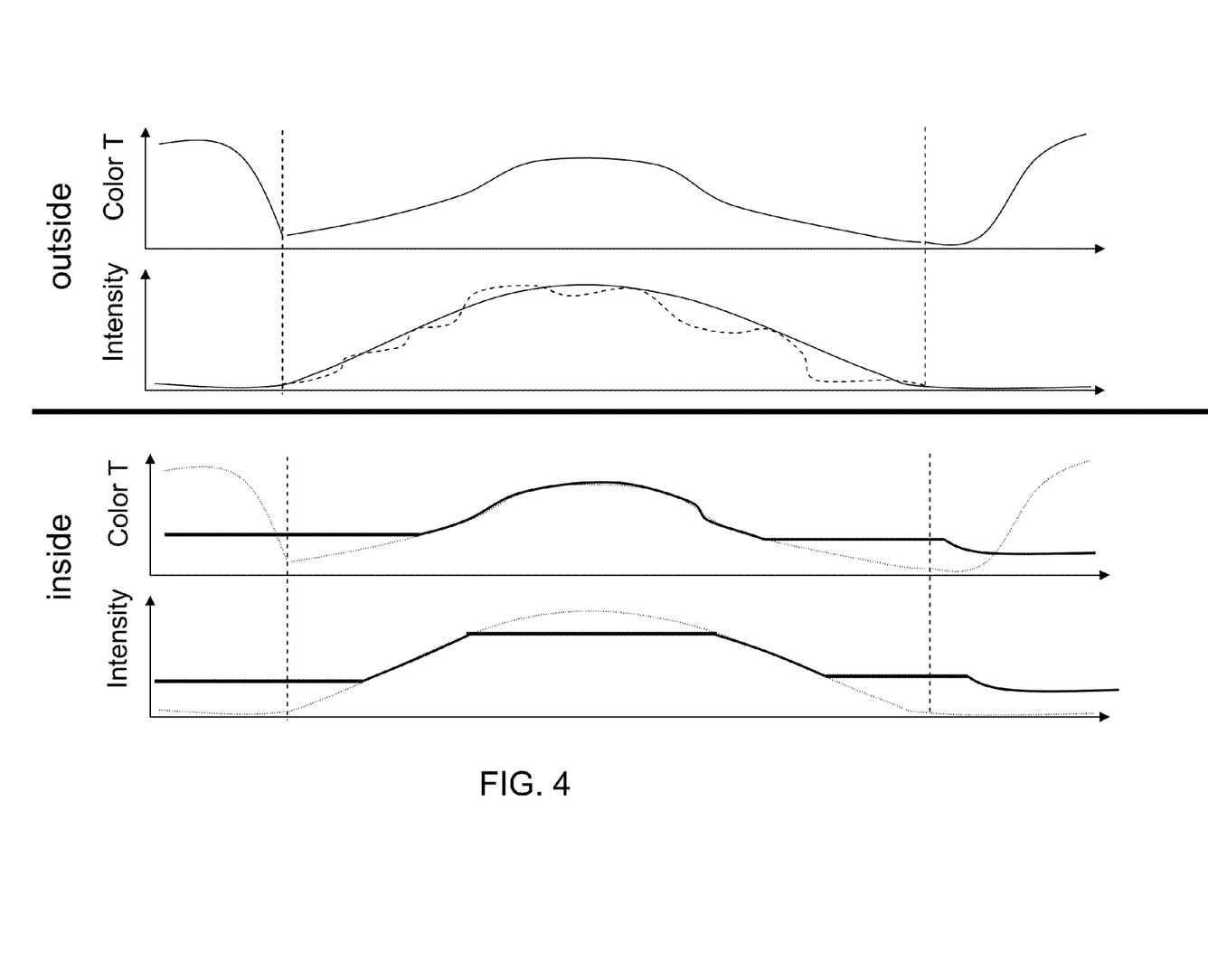
FIG. 4 shows how the variations of FIG. 3 can be mapped to a desired color temperature and intensity profile.

FIG. 4 shows how the variations of FIG. 3 can be mapped to a desired default color temperature and intensity profile. The top plots are those of FIG. 3. The bottom plots show a standardised color temperature and intensity profile, and these can be used as a default setting.

Figure 5:
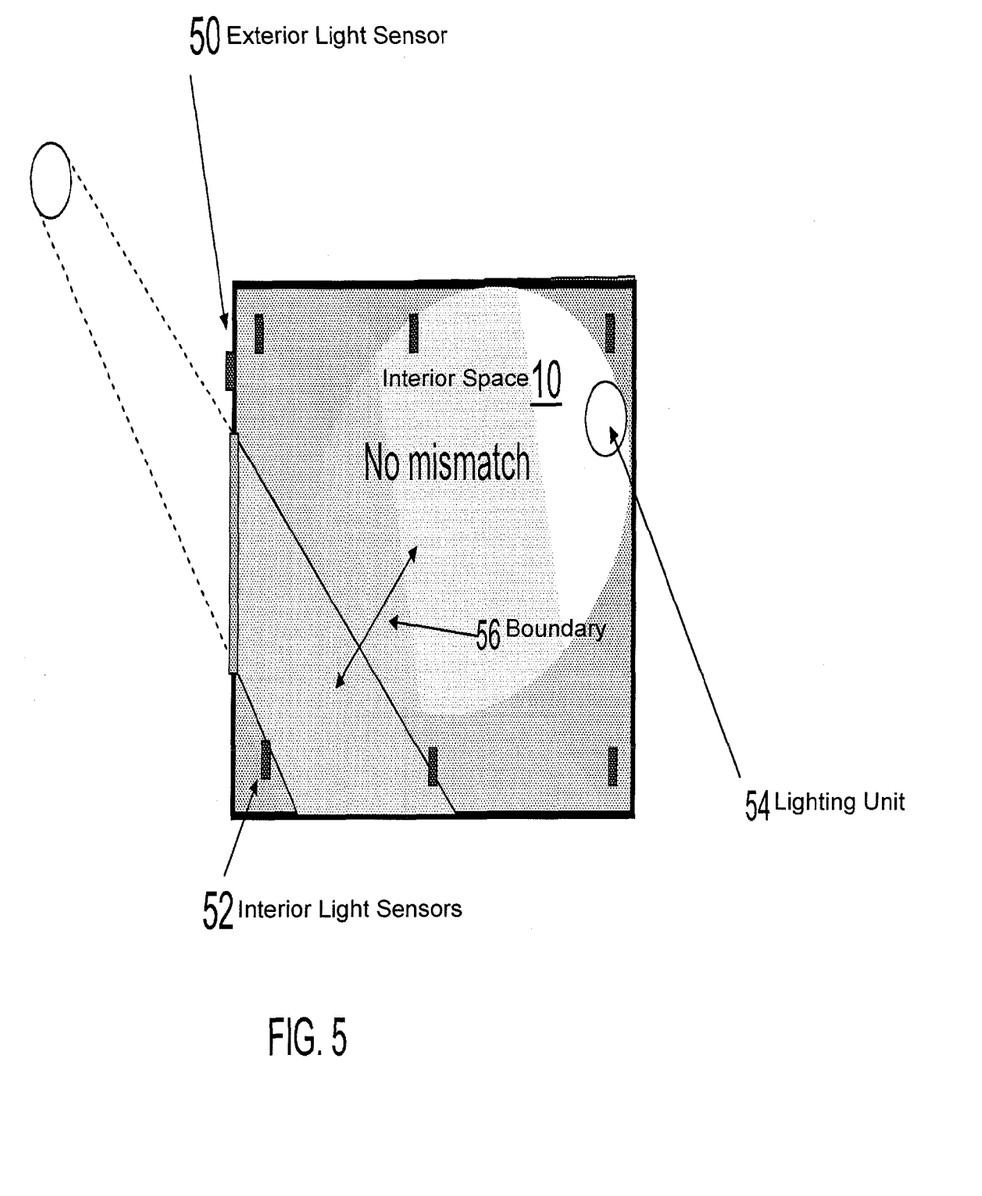
FIG. 5 shows a first example of how a lighting system of the invention can operate.

FIG. 5 shows a first example of how a lighting system of the invention can operate.

The lighting system has an exterior light sensor 50 for detecting the exterior lighting color. The exterior light intensity can also be measured, although this is not needed for a most basic implementation, since the primary aim is to avoid abrupt color temperature boundaries rather than brightness intensity boundaries.

The color can be detected using an RGB sensor with a diffuser, or "white card" reflected light measurement can be used. This can be a very simple device.

A set of similar interior light sensors 52 are positioned around the room, so that a color temperature profile within the interior space can be derived. There may be an array of internal sensors as shown. At the limit, only one sensor may be used, if there is only one area where internal and external color temperature are to be matched. However, a set of light sensors is preferably used.

These sensors 52 also measure the light intensity level.

The lighting unit 54 comprises an LED light fixture with adjustable color and intensity. RGB LED lighting can be used, with accurate wavelength control.

The lighting unit 54 is controlled using a feedback loop which ensures that there is no mismatch in color temperature at the boundary 56 between light generated principally by the lighting unit and light having a significant content from outside. This boundary 56 can be thought of as being located in a color match zone, where the interior space lighting is to be matched in color temperature to the exterior lighting. In the color match zone, shadows are softened.

The aim of the color matching is primarily to try to match the color temperature but also to adjust the intensity by taking into account the light contribution externally. The color temperature of the natural light source is thus copied dynamically.

The light intensity can also follow the exterior conditions, but using thresholds. For example, when sunlight comes in, the intensity inside is limited so that it will reach a threshold. Similarly, the intensity inside is maintained above a lower threshold. The interior space will thus always be light enough, with the right color temperature inside.

The bottom graph of FIG. 4 shows one possible intensity profile during the course of the day. The profile has lower and upper bounds, but otherwise follows the exterior lighting intensity pattern, so that the user has the feeling of natural light, including the way the intensity of the light evolves during the course of the day. The system includes damping/filtering so that the rapid fluctuations shown as the dotted line in the top intensity profile in FIG. 4 are filtered out.

Thus, the light intensity is controlled to provide the desired lighting level, but also to reduce contrast with the exterior light. Thus, if the exterior light is very bright, the interior space may be made brighter that would be the case when it is dark outside, to reduce the mismatch at the boundary 56. Thus, the interior light intensity can also be a function of the exterior light intensity, as well as always being chosen to provide an adequate level of interior lighting.

Figure 6:
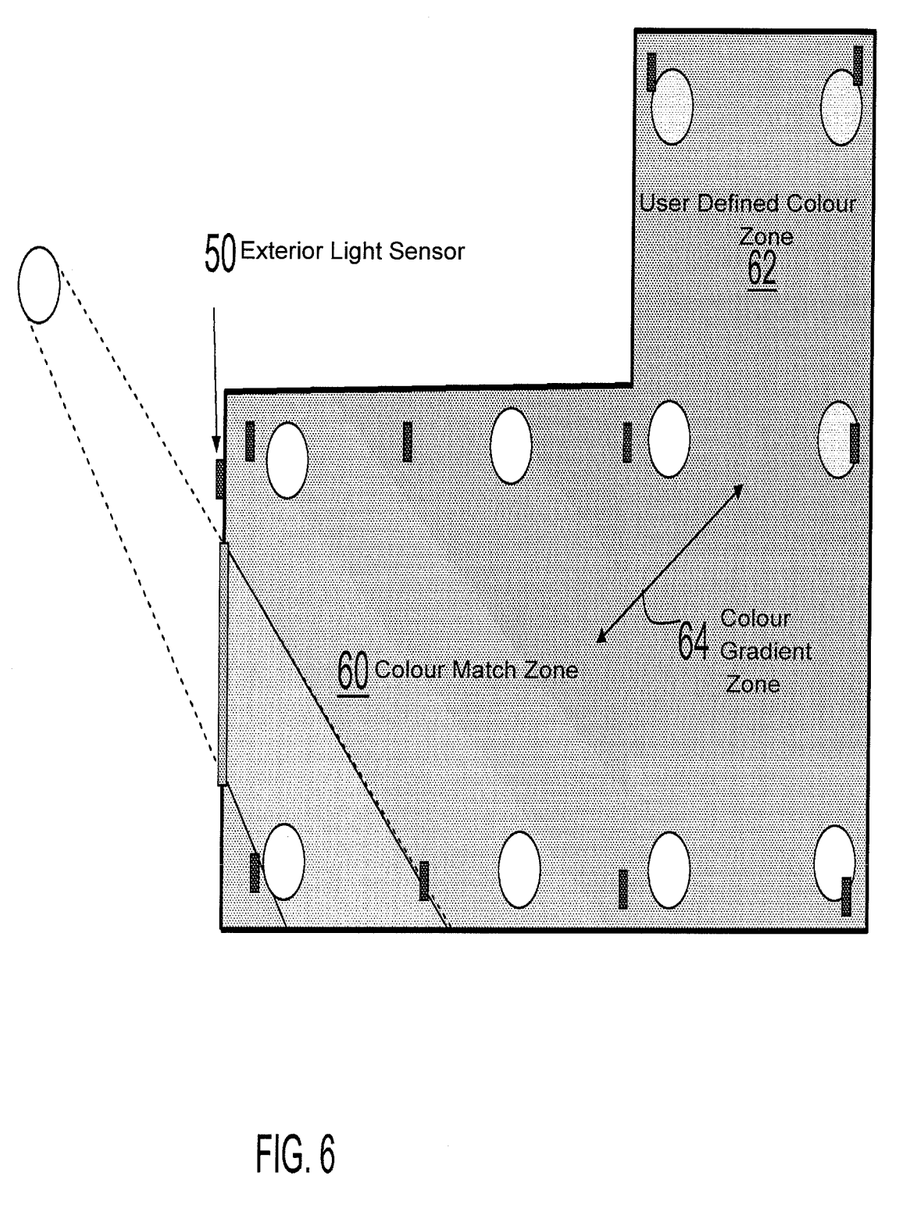
FIG. 6 shows a second example of how a lighting system of the invention can operate.

FIG. 6 shows a second example of how a lighting system of the invention can operate.

The interior space has three zones.

Zone 60 is a color match zone as previously explained, where there is an interaction between direct (non-reflected) exterior sunlight and the internal lighting.

Zone 62 is a user defined color zone. This has little light received from the exterior, so that the light color can be controlled, without significant adjustment needed to take account of the external lighting conditions.

Zone 64 is a color gradient zone between the user defined color zone 62 and the color match zone 60. This is used to create soft intensity gradients and color gradients between the zones with (zone 60) and without (zone 62) significant outside light input.

Figure 7:
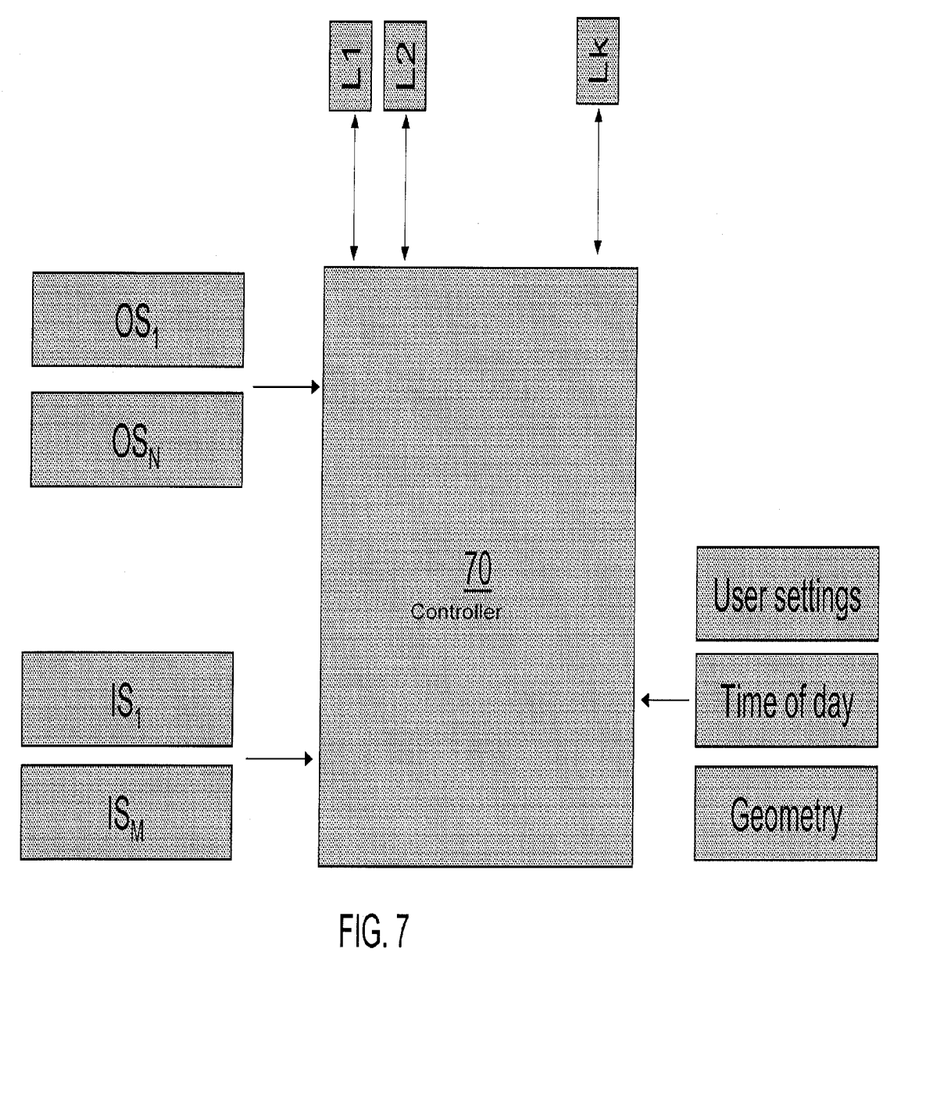
FIG. 7 shows a lighting system of the invention.

FIG. 7 shows a lighting system of the invention.

The outside sensors are shown as $OS_1 \ldots OS_N$ and the inside sensors are shown as $IS_1 \ldots IS_M$. The lighting system has lighting units L1 ... Lk.

The sensor signals are all provided to a controller 70, which generates the control signals for the lighting units. The controller 70 also receives user settings which can for example override the feedback system if desired, and for example for defined the user zone 62. The time of day is used as an input by the controller 70, for example so that the default general intensity and color profiles of FIG. 4 can be followed.

The geometry input is used to define how the lighting units and sensors are positioned so that suitable control can be implemented.

As mentioned above, the intensity inside follows the outside intensity within boundary limits. These boundary limits are selected so that intensity contrast can still be smoothed inside. Similarly, the color temperature follows the outside color temperature, but again within bounds. This is shown in the color temperature plot at the bottom of FIG. 4, where a minimum color temperature is provided. Most of the day, the outside color temperature is followed, but not in early morning or late evening, since the lower color outside temperature does not provide good color rendering for eyesight.

There are two possible operating modes:

In a first operating mode, the aims are to provided a good color match between externally lit and internally lit areas and to reduce contrast by adding more light where necessary. This requires monitoring of the external light color, interior illumination level, and optionally external light intensity.

In a second operating mode, it is desired to have a specific color temperature inside, but outside light has another color temperature. The inside light should only add the necessary part of the spectrum (i.e. more red/yellow if the color temperature outside is higher than desired). This then defines the user-defined area, and the internal light sensors alone can be used to determine the color that needs to be added. The color matching zone then additionally softens the transition to the exterior color temperature when there is a boundary to direct light received from a window, for example. This uses the exterior light sensor. When adding light to change the color temperature of an internal space, intensity control is more restricted because it is only possible to add light.

Figure 8:
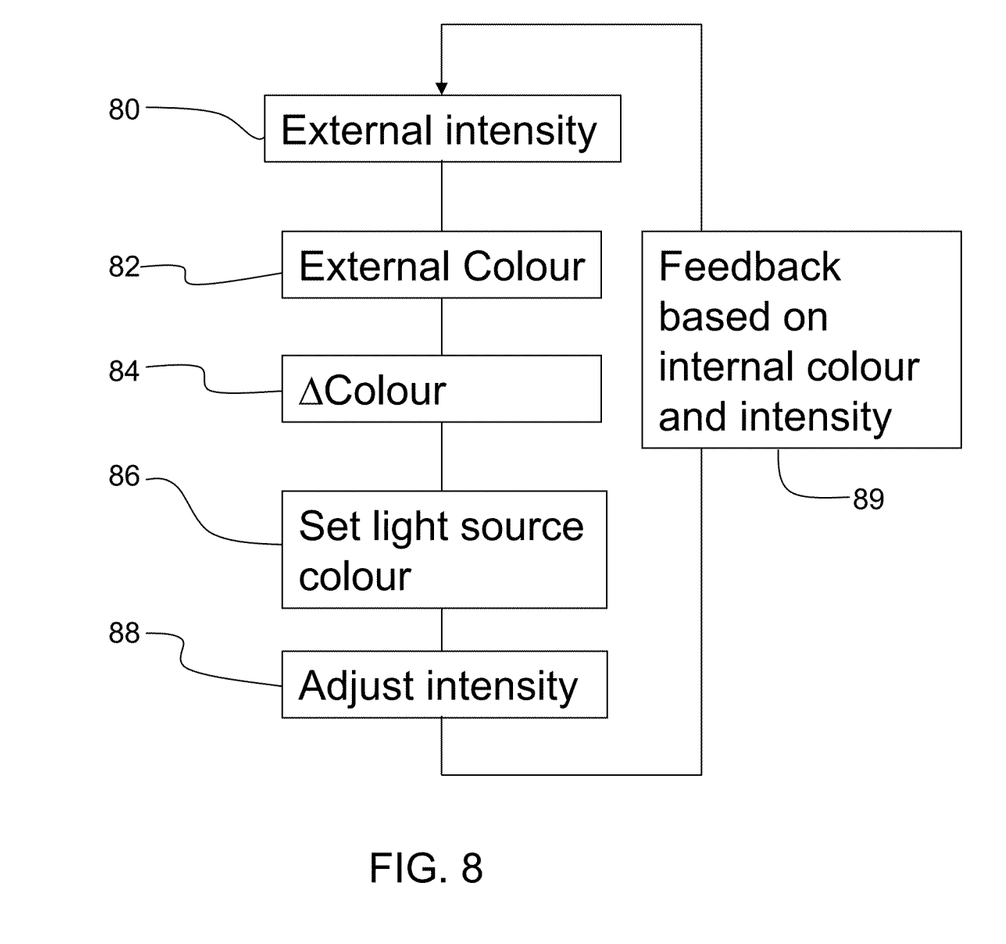
FIG. 8 is a flow diagram showing the control method of the invention.

A general, algorithm is shown in FIG. 8 and comprises:
 (i) Measure the external light intensity (step 80).
 (ii) Measure the external light color temperature (step 82).
 (iii) Calculate the spectrum difference between incoming light and the desired lighting (step 84). The desired lighting can be either user-set (static) or depend on the outside condition, and follow the graphs at the bottom of FIG. 4.
 (iv) Set the RGB light source to add the missing part of the spectrum thereby to change the color temperature (step 86).
 (v) Add white or colored light of the right color temperature to adjust the intensity (step 88).

This process involves shifting the color temperature to the desired color temperature point, and then adjusting the intensity. The control scheme includes a feedback loop which includes monitoring of the internal lighting conditions (step 89).

The color temperature can be calculated for any color, but the invention is particularly concerned with nearly white sources. LEDs enable color control to a resolution that is better than can be detected by a human (for example less than 2.5 nm wavelength shift). The shift in color temperature is in practice a red/blue shift.

The sensors do not need to be at the exact location where color matching is needed. Most surfaces are diffuse reflectors, so incident light is very rapidly spread out over a large area. Interpolation is therefore sufficient to enable control of the system.

It will be understood from the description above that the system of the invention can be used to implement various control strategies. These can include matching the color temperature to the outside light with or without the boundaries explained with reference to FIG. 4. The exterior light sensor can be for color only, or it can be for color and intensity.

The system can have various settings to override the feedback control method. For example, the system can be controlled to follow the default pattern of color temperature and intensity, without using exterior light feedback. The system can be controlled to implement a user defined color temperature and intensity inside, and the feedback approach is then used only to soften the boundaries with the light which is coming in from the exterior. Thus, the control of the lighting to be based on the external light can be confined to a transition zone where there is direct light from outside, or it can be applied to a larger internal area, or can be applied to the full internal area.

Various modifications will be apparent to those skilled in the art.

The invention claimed is:

1. A lighting system for an interior space comprising:
 a first light sensor configured and arranged to indicate at least one exterior lighting colour;
 a second light sensor configured and arranged to indicate an interior lighting level and at least one colour of an interior lighting space;
 a lighting unit having adjustable colour and intensity; and
 a controller for controlling the lighting unit, wherein the controller is adapted to
 adjust the colour and intensity of the lighting unit based on the light sensor indications including multiple exterior natural-light-source lighting colour indications provided by the first light sensor and interior lighting colour indications provided by the second light sensor, to obtain a colour gradient that is between a colour match zone where the interior space lighting has a colour temperature dependent on the multiple exterior natural-light-source lighting colour indications at different times during a course of a day and a defined colour zone.

2. A system as claimed in claim 1, wherein in the colour match zone, the interior space lighting has a colour temperature matched to the colour temperature of the exterior lighting, when the exterior lighting colour temperature is within upper and lower bounds during the course of a day and is indicative of preset or expected natural-light conditions, wherein the upper and lower bounds include thresholds of the interior space lighting matching the exterior lighting.

3. A system as claimed in claim 1, wherein in the colour match zone, the interior space lighting has a light intensity matched to an exterior light intensity, when the exterior light intensity is within upper and lower bounds during the course of a day and is indicative of preset or expected natural-light conditions, wherein the upper and lower bounds include thresholds of the interior space lighting matching the exterior lighting.

4. A system as claimed in claim 1, further including a timer configured and arranged for providing a time of day signal to the controller, and the controller further adapted to disable the adjustment of the lighting unit when the time of day is outside a pre-configured time period, whereby the colour and intensity of the lighting unit is adjusted to a default profile.

5. A system as claimed in claim 1, further including at least one other lighting unit, the controller configured and arranged to adjust the colour and intensity of each lighting unit based at least in part on exposure of the interior light sensor for each of the respective lighting units to exterior light and to prevent colour boundaries between the exterior and interior light within the colour match zone by matching the colour indications at least in the vicinity of a window.

6. A system as claimed in claim 1, comprising a plurality of light sensors for the interior space.

7. A system as claimed in claim 1, wherein the lighting unit comprises LED light fixture.

8. A system as claimed in claim 1, wherein the controller is further adapted to:
 adjust the colour and intensity of the lighting unit based on user input thereby to obtain the defined colour zone, and to provide the colour gradient and an intensity gradient between the defined colour zone and the colour match zone to prevent a mismatch in colour temperature and intensity between the defined colour zone and the colour match zone during a period of time of the day.

9. A method of controlling a lighting system for an interior space, comprising:
monitoring an exterior lighting colour indicated by a first light sensor;
monitoring an interior lighting level and colour indicated by a second light sensor; and
controlling a lighting unit to:
adjust the colour and intensity based on the colour indications of the exterior lighting colour and indications of the interior lighting colour thereby to define a colour match zone where the interior space lighting has a colour temperature dependent on the exterior lighting, wherein the adjustment of the interior space lighting takes place when the exterior lighting is within upper and lower bounds during a course of a day and is indicative of preset or expected natural-light conditions; and
adjust the colour of the lighting unit to obtain a defined colour zone, and to provide a colour gradient between the defined colour zone and the colour match zone.

10. A method as claimed in claim 9, wherein in the colour match zone, the interior space lighting is controlled to have a colour temperature matched to the colour temperature of the exterior lighting, when the exterior lighting colour temperature is within the upper and lower bounds, wherein the upper and lower bounds include thresholds of the interior space lighting matching the exterior lighting.

11. A method as claimed in claim 9, wherein in the colour match zone, the interior space lighting is controlled to have a light intensity matched to an exterior light intensity, when the exterior light intensity is within the upper and lower bounds.

12. A method as claimed in claim 9, comprising using a timer to provide a time of day signal to the controller, and disabling the adjustment of the lighting unit when the time of day is outside a pre-configured time window and whereby the colour and intensity of the lighting unit is adjusted to a default profile.

13. A method as claimed in claim 9, comprising:
measuring an external light colour temperature;
calculating a spectrum difference between the external light colour temperature and a desired internal lighting colour temperature;
controlling the lighting unit to add the calculated missing part of the spectrum thereby to change the internal lighting colour temperature; and
adding light to adjust the intensity to a desired internal lighting intensity.

14. A method as claimed in claim 13, comprising implementing a feedback loop for measuring the internal light colour temperature and intensity such that the controlling takes account of the actual internal light colour temperature and intensity as well as the desired light colour temperature and intensity.

15. A system as claimed in claim 1, wherein the controller is further configured and arranged to
adjust a colour of interior light provided by the lighting unit in the colour match zone to match the indicated exterior lighting colour; and
adjust intensity of the lighting unit based on a total light intensity of interior light and exterior light in the colour match zone.

16. A lighting system as claimed in claim 15, wherein the controller is further configured and arranged to adjust the lighting unit to obtain the colour match zone when a current output of the first lighting sensor associated with lighting colour is within a pre-configured upper and lower threshold and to adjust the lighting unit to a pre-configured interior lighting colour when the current output of the first light sensor is outside the pre-configured upper and lower thresholds.

17. A system as claimed in claim 15, further including a timer configured and arranged for providing a time of day signal to the controller, and the controller is further configured and arranged to disable the adjustment of the lighting unit when the time of day is outside a pre-configured time window and whereby the colour and intensity of the lighting unit is adjusted to a default colour and intensity.

18. A system as claimed in claim 15, wherein the controller is further configured and arranged to adjust the light intensity of the lighting unit based on a current output of the first light sensor associated with light intensity when the current output of the exterior lighting is within a pre-configured upper and lower intensity threshold, and adjust the light intensity of the lighting unit to a pre-configured interior lighting intensity when the current output is outside the pre-configured upper and lower thresholds.

19. A system as claimed in claim 15, wherein the controller is further configured and arranged to identify rapid light intensity fluctuations in a current output of the first light sensor, the current output indicative of light intensity, and to dampen the adjusting of the intensity by the controller.

20. A method as claimed in claim 14, wherein implementing the feedback loop includes preventing a mismatch in colour temperature at a boundary between light generated by the lighting unit and light associated with content from the outside.

* * * * *